Figure 1:
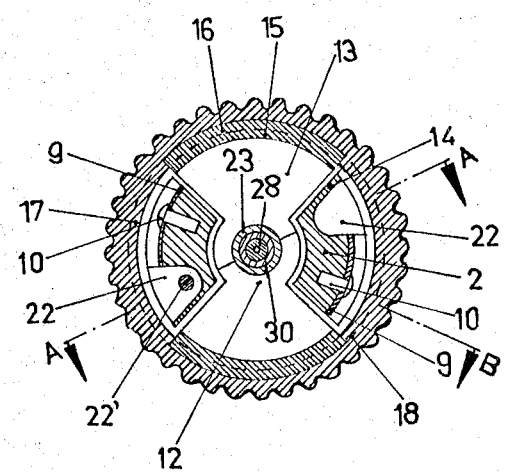

March 7, 1967  H. T. NIELSEN ETAL  3,307,404

AUTOMATIC THERMOSTATIC VALVE REGULATOR

Filed July 6, 1964

United States Patent Office 3,307,404
Patented Mar. 7, 1967

3,307,404
AUTOMATIC THERMOSTATIC
VALVE REGULATOR
Helmar Trøst Nielsen, Nordborg, and Knud Aage Hansen, Sonderborg, Denmark, assignors to Danfoss A/S, Nordborg, Denmark, a corporation of Denmark
Filed July 6, 1964, Ser. No. 380,465
Claims priority, application Germany, Aug. 14, 1963, D 42,236
9 Claims. (Cl. 73—368.7)

This invention relates generally to thermostatically controlled valves and more particularly to a new and improved automatic thermostatic valve regulator.

It is a principal object of the present invention to provide a new and improved thermostatic regulator of reduced dimensions easy to construct and more effective in automatic control of set temperatures and temperature regulation.

A feature of the automatic thermostatic regulator according to the invention is the provision of a traveling abutment movable axially of the longitudinal axis of the regulator for variably compressing a control spring for setting the range of temperatures to be controlled. The abutment is provided with at least one radial arm extending radially from the longitudinal axis and the abutment and generally axially of the longitudinal axis away from the abutment to cooperate with another rotary operated outer adjustment member having a complementary thread to the thread on the arm. The axial displacement of the arm relative to the abutment permits a general axial shortening of the overall axial dimensions of the valve regulator.

Another feature of the invention is the provision of an elongated actuating element displaceable axially for controllably actuating the valve operating member that controls the operating conditions of the valve. The actuator element comprises a plastic valve stem portion or actuating element internally of a contractible and expansible system comprising a bellows and circumferentially of which is disposed the valve regulator control spring bearing on the aforementioned traveling abutment. The plastic actuating element is provided with radial ribs extending longitudinally thereof for reducing transfer of heat from the valve being controlled to a temperature-responsive fluid internally of the bellows thereby improving the sensitivity and response characteristics of the regulator over known valve regulators. The radial ribs are configured to allow the actuating element to be freely connected to a free end of the bellows and the opposite end thereof is limited in axial travel by a partition of the regulator casing without the need of the usual known internal cylindrical stops in known regulators for limiting contraction of the bellows to preclude overstressing thereof, as the bellows is variably compressed in setting the operation or controlled temperature of the regulator. The actuating element, therefore, aside from transmitting the movements of the actuator comprises a safety device.

Figure 2:
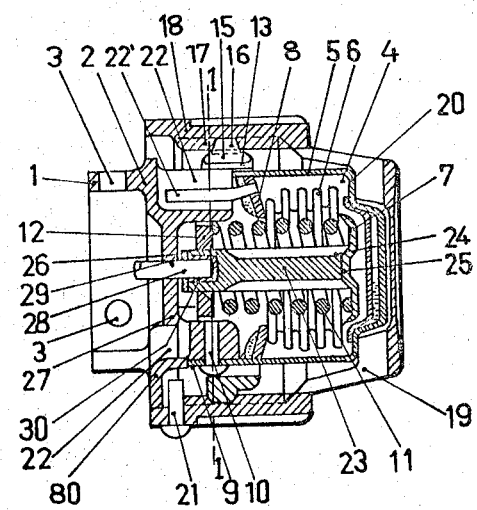

Other features and advantages of the present invention will be better understood as described in the following specification and appended claims in conjunction with the drawings in which:

FIG. 1 is a cross-section view taken along line 1—1 of FIG. 2 corresponding with a cut-taken through a traveling abutment of the regulator illustrated in FIG. 2; and FIG. 2 is a longitudinal section view taken along section line A–B of FIG. 1.

According to the drawing, the regulator of the invention comprises a body portion 2 provided with an annular extension 1 having angularly spaced openings 3 for permanently or removably and thereby semi-permanently mounting the regulator on the body of a valve, not shown, to be thermostatically and automatically controlled. The regulator is mounted on the body of the valve in the manner in which a bonnet is generally mounted on non-automatic valves.

The regulator comprises an actuator 4 which comprises the various control parts responsive to temperature variations of an ambient temperature being sensed and capable of variably controlling and adjusting the operating conditions of the valve being thermostatically controlled. The actuator comprises a housing or casing 5 internally of which is housed a bellows 6 having a free end closed by a closure 7. The casing 5 is provided with an internal, annular flange 8 on which the bellows 6 is seated in a fluid-tight manner defining between the outer housing and the bellows 6 a compartment containing a temperature-responsive fluid, not shown, the pressure vapor of which varies with temperature variations of the ambient temperature being sensed. The casing 5 is provided with angularly spaced extensions 9 extending circumferentially of an annular portion of the regulator body portion 2 and secured thereto by pins 10. These pins may be loosely fitted in respective holes since they will not back-off because the casing 5 is biased and held in assembly with the regulator portion 2 by the pressure applied by a control spring as hereinafter explained. A control spring 11 is mounted internally of the bellows and has one end thereof bearing on the closure 7 and an opposite end seated on an abutment 12 capable of axial travel relative to the longitudinal axis of the regulator for variably compressing the spring 11 to determine or set the temperature settings as hereinafter explained.

The abutment 12 is provided with a plurality of radial arms 13 extending through apertures in the body portion 2 which comprises a part of the actuator means and therefore extending outwardly of the actuator 4. The arms are provided with a peripheral rim section 15 having an outer thread 16 engaging a complementary internal thread 17 of an adjustment or temperature-setting control member 18.

The member 18 is a one-piece cylindrical member having a rotatable annular body portion provided with integral angularly spaced ribs 19 extending axially therefrom and constructed with transversely extending shoulders, as illustrated, that abut against an annular surface 20 of the housing or casing 5 due to the axially directed pressure exerted by the spring 11 on the abutment 12 which transmits an axially directed force to the outer control member 18 in a direction for maintaining it and the actuator 4 in axially-assembled relationship. The ribs 19 connect an end annular portion of the cylindrical control member 18, as illustrated, to the tubular part thereof.

The regulator is provided with a stop comprising a pin 21 on the manually rotatable member 18 to limit the travel of the rim sections 15 relative to the control member, thereby preclude the possibility of overtravel of the members so that the control member 18 cannot be screwed off of the regulator. Furthermore, the stop 21 precludes allowing over-extension of the spring 11.

The valve parts define a space 22 in which is disposed and fragmentarily illustrated a capillary tube 22' connected to a temperature sensing element, for example a bulb in a room, not shown. The capillary tube is connected in communication with the fluid-filled compartment internally of the actuator 4 and extends through the annular flange 8.

The actuator 4 is provided with an elongated actuating element 23 preferably made of plastic and provided with radial ribs 24 longer than the body portion of the member 23 and defining in conjunction therewith a socket into which is received a dished part 25 of the end closure 7 of the bellows. The actuating element 23 need not be connected to the free end of the bellows that moves in response to vapor pressure variations internally of the actuator. The opposite end of the actuating element comprises an annular surface 26 which is seatable on an inwardly extending annular flange 27 of the regulator body 2. The surface 26 of the flange 27 jointly form a stop precluding overstressing the bellows 6 by overcompressing the bellows and the spring internally thereof. The actuator element 23 is operably and releasably connected to a valve operating member, for example a valve stem 28 extending through an opening in the flange 27 in a snug manner but capable of moving axially therethrough under control of the axial movements of the actuator element 23 in response to the expansion and contraction of the bellows.

The flange 27 is provided with an opening 29 and the valve stem is received in a recess formed by a bushing 30 in the actuating element 23 dimensioned to accommodate a given dimensioned valve stem. It is to be understood that the operable connection between the valve stem 28 and the actuator 23 is maintained, for example, by a spring, not shown, internally of the valve, not shown, biasing the valve stem in a direction opposite to the biasing force of the control spring biasing the valve in a direction toward a given operating condition of the valve which is varied by the regulator. The actuator element 23 cannot move axially, outwardly of the actuator 4 in view of the partition 27 and there is therefore no necessity for fixing it or securing it to the closure 7 of the bellows. Moreover, the lower part of the actuator element 23 provides an axial guide on which the abutment travels. The ribs thereof are dimensioned to act as guides in the remaining travel of the abutment.

Those skilled in the art will understand from the above described construction of the regulator that the regulator has a very wide range of control settings since the traveling abutment can move axially substantially the axial length of the valve corresponding from about a plane passing through the flange 27 and a plane passing substantially through the annular flange 8. Those skilled in the art will further understand that the projections or extensions 9 on the actuator casing 5 do not in any manner hinder the travel of the abutment 12. Furthermore, should the control spring 11 break or should the vapor pressure within the actuator become too high, the actuating element 23 will come to rest on the partition 27 thereby preventing any further contraction of the bellows 6.

Moreover, the pins 10 need not be permanently secured to the regulator body portion since the axial pressure applied by the member 18 on the annular surface 20 keeps the various parts assembled and the regulator can be readily removed from the valve and easily disassembled for ease of repair thereof. The valve parts are readily assembled since the body portion 2 is provided with radial projections as illustrated against which the member 18 bears, as illustrated along side pin 21, so that the member 18 is readily assembled radially with respect to the other regulator parts and is held concentric therewith and axially in assembly as before described.

While a preferred embodiment of the regulator according to the invention has been illustrated and described, it will be understood that many variations thereof can be made within the true spirit and scope of the invention.

What we claim and desire to secure by Letters Patent is:

1. In an automatic thermostatic valve regulator for automatically thermostatically controlling a valve having an actuatable operating element for opening and closing the valve, said regulator comprising, means for mounting said regulator on a valve to be thermostatically controlled, actuator means comprising temperature-responsive means including a temperature-responsive fluid for sensing an ambient temperature and responding to variations thereof for actuating said valve operating element in response to said variations of the ambient temperature being sensed, a spring in said actuator means operably connected to said valve operating element in operation for biasing said operating element in a given direction corresponding to an operating condition of said valve, means for setting the value of the force applied by said spring comprising means defining an abutment in said actuator on which said spring bears, means in said actuator means mounting said abutment movable in a direction axially of a longitudinal axis of said actuator means, said abutment comprising at least one radial arm extending outwardly of said actuator means and extending generally axially of said longitudinal axis in an axial direction away from said abutment and comprising an external thread, a cylindrical adjustment element on said regulator mounted circumferentially of said actuator, means for setting a temperature to be maintained by said regulator and comprising an internal thread on said cylindrical adjustment element complementary with said external thread for moving said abutment in a direction axially of said longitudinal axis, said cylindrical adjustment element having a transverse portion extending transversely of said actuator means, and said spring being disposed biasing said abutment in a direction axially of said longitudinal axis for biasing said cylindrical element in an axial direction for causing said portion of said cylindrical element to bear on said actuator means to hold said actuator means and said cylindrical element in axially-assembled relationship.

2. In an automatic thermostatic valve regulator for automatically thermostatically controlling a valve having an actuatable operating element for opening and closing the valve, said regulator comprising, means for mounting said regulator on a valve to be thermostatically controlled, actuator means comprising temperature-responsive means including a temperature-responsive fluid for sensing an ambient temperature and responding to variations thereof for actuating said valve operating element in response to said variations of the ambient temperature being sensed, a spring in said actuator means operably connected to said valve operating element in operation for biasing said operating element in a given direction corresponding to an operating condition of said valve, means for setting the value of the force applied by said spring comprising means defining an abutment in said actuator on which said spring bears, means in said actuator mounting said abutment movable in a direction axially of a longitudinal axis of said actuator, said abutment comprising at least one radial arm extending outwardly of said actuator means and extending generally axially of said longitudinal axis in an axial direction away from said abutment and comprising an external thread, a cylindrical adjustment element on said regulator mounted circumferentially of said actuator means for setting a temperature to be maintained by said regulator and having an internal thread complementary with said external thread for moving said abutment in a direction axially of said longitudinal axis and having a transverse portion extending transversely of said actuator means, said spring being disposed biasing said abutment in a direction axially of said longitudinal axis for biasing said cylindrical element in an axial direction for causing said portion of said cylindrical element to bear on said actuator means to hold said actuator means and said cylindrical element in axial assembled relationship, a stop on said actuator means, and a stop on said cylindrical element for engaging the stop on said actuator to limit the angular rotation of said cylindrical element relative to said actuator means thereby to limit the axial travel of said abutment.

3. In an automatic thermostatic valve regulator for automatically thermostatically controlling a valve having an actuatable operating element for opening and closing the valve, said regulator comprising, means for mounting said regulator on a valve to be thermostatically controlled, actuator means comprising temperature-responsive means including a temperature-responsive fluid for sensing an ambient temperature and responding to variations thereof for actuating said valve operating element in response to said variations of the ambient temperature being sensed, a spring in said actuator means operably connected to said valve operating element in operation for biasing said operating element in a given direction corresponding to an operating condition of said valve, means for setting the value of the force applied by said spring comprising means defining an abutment in said actuator on which said spring bears, means in said actuator mounting said abutment movable in a direction axially of a longitudinal axis of said actuator, said abutment comprising at least one radial arm extending outwardly of said actuator means and extending generally axially of said longitudinal axis in an axial direction away from said abutment and comprising an external thread, a cylindrical adjustment element on said regulator mounted circumferentially of said actuator means for setting a temperature to be maintained by said regulator and having an internal thread complementary with said external thread for moving said abutment in a direction axially of said longitudinal axis and having a transverse portion extending transversely of said actuator means, said spring being disposed biasing said abutment in a direction axially of said longitudinal axis for biasing said cylindrical element in an axial direction for causing said portion of said cylindrical element to bear on said actuator means to hold said actuator means and said cylindrical element in axial assembled relationship, said actuator means comprising an elongated actuating element actuated longitudinally for actuating said valve operating element, said actuating element being disposed coaxially with said spring, means in said actuator means operably connecting said spring and said actuating element, stop means on said regulator for limiting the axial travel of said actuating element longitudinally in one direction for limiting the expansion of said spring.

4. In an automatic thermostatic valve regulator for automatically thermostatically controlling a valve having an actuatable operating element for opening and closing the valve, said regulator comprising, means for mounting said regulator on a valve to be thermostatically controlled, actuator means comprising temperature-responsive means including a temperature-responsive fluid for sensing an ambient temperature and responding to variations thereof for actuating said valve operating element in response to said variations of the ambient temperature being sensed, a spring in said actuator means operably connected to said valve operating element in operation for biasing said operating element in a given direction corresponding to an operating condition of said valve, means for setting the value of the force applied by said spring comprising means defining an abutment in said actuator on which said spring bears, means in said actuator mounting said abutment movable in a direction axially of a longitudinal axis of said actuator, said abutment comprising at least one radial arm extending outwardly of said actuator means and extending generally axially of said longitudinal axis in an axial direction away from said abutment and comprising an external thread, a cylindrical adjustment element on said regulator mounted circumferentially of said actuator means for setting a temperature to be maintained by said regulator and having an internal thread complementary with said external thread for moving said abutment in a direction axially of said longitudinal axis and having a transverse portion extending transversely of said actuator means, said spring biasing said abutment in a direction axially of said longitudinal axis for biasing said cylindrical element in an axial direction for causing said portion of said cylindrical element to bear on said actuator means to hold said actuator means and said cylindrical element in axial assembled relationship, said actuator means comprising an expansible and contractible bellows having means closing a free end thereof, said spring being disposed internally of said bellows, an elongated actuating element disposed internally of said bellows coaxially with said spring and actuated longitudinally by said bellows for actuating said valve operating member, a partition in said regulator through which said operating member extends disposed for limiting the axial travel of said actuating member in a direction for limiting the expansion of said spring and the compression of said bellows, whereby said actuating element and said partition comprise a safety device in said regulator.

5. An automatic thermostatic valve regulator according to claim 4, in which said actuating element comprises a plurality of angularly spaced radial ribs extending axially thereof, said actuating element and ribs thereof being disposed for assisting in guiding axial travel of said abutment relative to said actuating element.

6. An automatic thermostatic valve regulator according to claim 5, in which said actuating element is made of plastic.

7. An automatic thermostatic valve regulator according to claim 6, in which said actuating element comprises a bushing on one end thereof for receiving said actuating element therein for operably connecting said actuating element and said valve operating element.

8. An automatic thermostatic valve regulator according to claim 7 in which said bellows comprises an end closure closing said free end, said closure having a portion dished in a direction toward the interior of said bellows, said ribs on said actuating element being configured to embrace and receive said dished portion for holding said actuating element coaxially with said bellows and without permanent connection to said end closure, said spring being disposed having one end seated on said end closure, and said end closure actuating said actuating element in one direction as said bellows contracts in response to variations in vapor pressure of said fluid in said regulator.

9. An automatic thermostatic valve regulator according to claim 8, in which said actuator means comprises a casing, and including a regulator body portion, said casing comprising angularly spaced extensions for mounting on said body portion, said casing comprising an internal flange on which said bellows is seated in a fluid-tight connection.

References Cited by the Examiner
UNITED STATES PATENTS

| | | | |
|---|---|---|---|
| 1,415,584 | 2/1922 | Lawler | 236—42 |
| 1,784,057 | 12/1930 | Giesler | 73—368.7 |
| 1,847,911 | 3/1932 | Trane | 236—42 |
| 1,882,803 | 10/1932 | Giesler | 236—42 |
| 1,920,505 | 8/1933 | Henney et al. | 236—92 |
| 2,160,453 | 5/1939 | Boles | 236—92 |
| 2,215,947 | 9/1940 | Wile | 236—99 |
| 3,071,156 | 1/1963 | Porland et al. | |
| 3,262,642 | 7/1966 | Nielsen et al. | 73—368.7 X |

LOUIS R. PRINCE, *Primary Examiner.*

W. A. HENRY, *Assistant Examiner.*